United States Patent [19]

Roy

[11] 3,920,917

[45] Nov. 18, 1975

[54] MODULATOR WITH NUMERICAL OPERATION FOR VOICE-FREQUENCY TELEGRAPHY AND SIMILAR SIGNALS

[75] Inventor: Marie-Annick Roy, Antony, France

[73] Assignee: Compagnie Industrielle des Telecommuncations Cit-Alcatel, France

[22] Filed: Feb. 27, 1974

[21] Appl. No.: 446,340

[30] Foreign Application Priority Data

Dec. 19, 1973 France .............................. 73.45573
Feb. 27, 1973 France .............................. 73.06950

[52] U.S. Cl. ............................ 179/15 A; 179/15 BY
[51] Int. Cl.$^2$ ............................................ H04J 3/00
[58] Field of Search .......... 179/15 A, 15 AP, 15 BY

[56] References Cited

UNITED STATES PATENTS 3,676,598 7/1972 Kurth ................................ 179/15 A

*Primary Examiner*—Ralph D. Blakeslee
*Attorney, Agent, or Firm*—Craig & Antonelli

[57] ABSTRACT

A modulator effects a series of filtering operations on successively scanned telegraphic signal channels. For this purpose a scanner scans the telegraphic signal channels and provides an output to a digital filter having a series of filter sections which are supplied with signals according to prescribed filter coefficients. These coefficients are stored in memories to be applied to the filter sections depending upon the state of each channel at the time it is scanned. The output of the digital filter is converted into analog format for transmission.

10 Claims, 4 Drawing Figures

MODULATOR WITH NUMERICAL OPERATION FOR VOICE-FREQUENCY TELEGRAPHY AND SIMILAR SIGNALS

The present invention relates to a modulator with numerical (digital) operation for the grouping of channels formed by binary signals or the separation of channels formed by previously grouped binary signals.

The present invention relates to a modulator which carries out frequency and filtering transpositions on channels of binary signals by means of elements with numerical operation, making use of numerical or digital coefficients entered into a memory, which are extracted by switches according to the particular channel of interest. Such channels of binary signals may, for example, be channels for voice-frequency telegraphy, channels for transmission of data, or signaling channels.

In telecommunication systems, it is common to transmit telegraphic messages by means of a high-frequency wave which may take on two frequency values, $F_o \pm \Delta F/2$, according to the polarity of the telegraphic signal to be transmitted, (1 or 0). A frequently used process consists, in a frequency multiplex system with multiple telephone channels, in transmitting a certain number N of voice-frequency telegraphy channels in a band of telephone channels, for example, 24 telegraphic channels at 50 bauds in a band of 4 kHz. These frequency transpositions require modulation and filtering means which must be dimensioned individually according to the sequence in the channel.

The present invention provides another more flexible solution comprising elements with numerical operation, notably a numerical (digital) filter, which lends itself to the sequential treatment of plural channels by a simple change of the numerical value of the coefficients employed in the operation. These coefficients, contained in memory, are extracted from the memory and applied to the numerical filtering elements as functions of the order of each incident telegraphic channel, and according to the instantaneous polarity of a channel to be transposed. For this purpose, the incident channels are sampled sequentially according to a circular permutation, and the samples are treated in such a manner as to effect the desired selection of the coefficients in memory and applying them to the elements of numerical calculation.

The complete apparatus comprises a calculation element (a numerical filter) and a memory containing the numerical coefficients to be introduced selectively in this element (certain of the numerical coefficients may be fed or entered at a fixed station in the calculation element). At the input of the calculation element, a circuit for sampling the incident telegraphic channels and for the selection control of the numerical coefficients in memory is provided, while at the output of the calculation element a numerical-analog converter and an analog band pass filter are provided.

The present invention is equally applicable, according to another embodiment, to telephone channel communications.

For the multiplexing telephone channels, it is known to group all of the samples in common channels, a so-called coded channel. The use of a coded channel is advantageous in view of the fact that it eliminates the necessity of signaling equipment for the transmission of the signal samples.

The present invention, according to the particular embodiments thereof, easily allows for grouping the signal samples of a group of channels in a unique channel.

Since sampling is carried out at a telegraphic speed of 20 bauds, in a band 4 kHz wide, one may group 60 samples. This is the case particularly for a secondary group of 60 channels in which one channel is utilized as a coded channel in order to group the samples of the 59 other channels of the group.

However, if, among the 60 channels of the secondary group, certain channels forming, for example, one or several primary groups, must be connected in parallel, it is necessary to smooth out the sampling channel by channel, for example, in inter-band type.

The present invention allows for the direct passage of samples grouped into a wider sample, channel by channel, or the inverse passage, without it being necessary to return to the level of the command pulses (RON - TRON).

In its application to voice-frequency telegraphy, the present invention will now be further described hereinafter in detail according to two embodiments thereof which have been illustrated respectively in the drawings.

DETAILED DESCRIPTION

Figure 1:
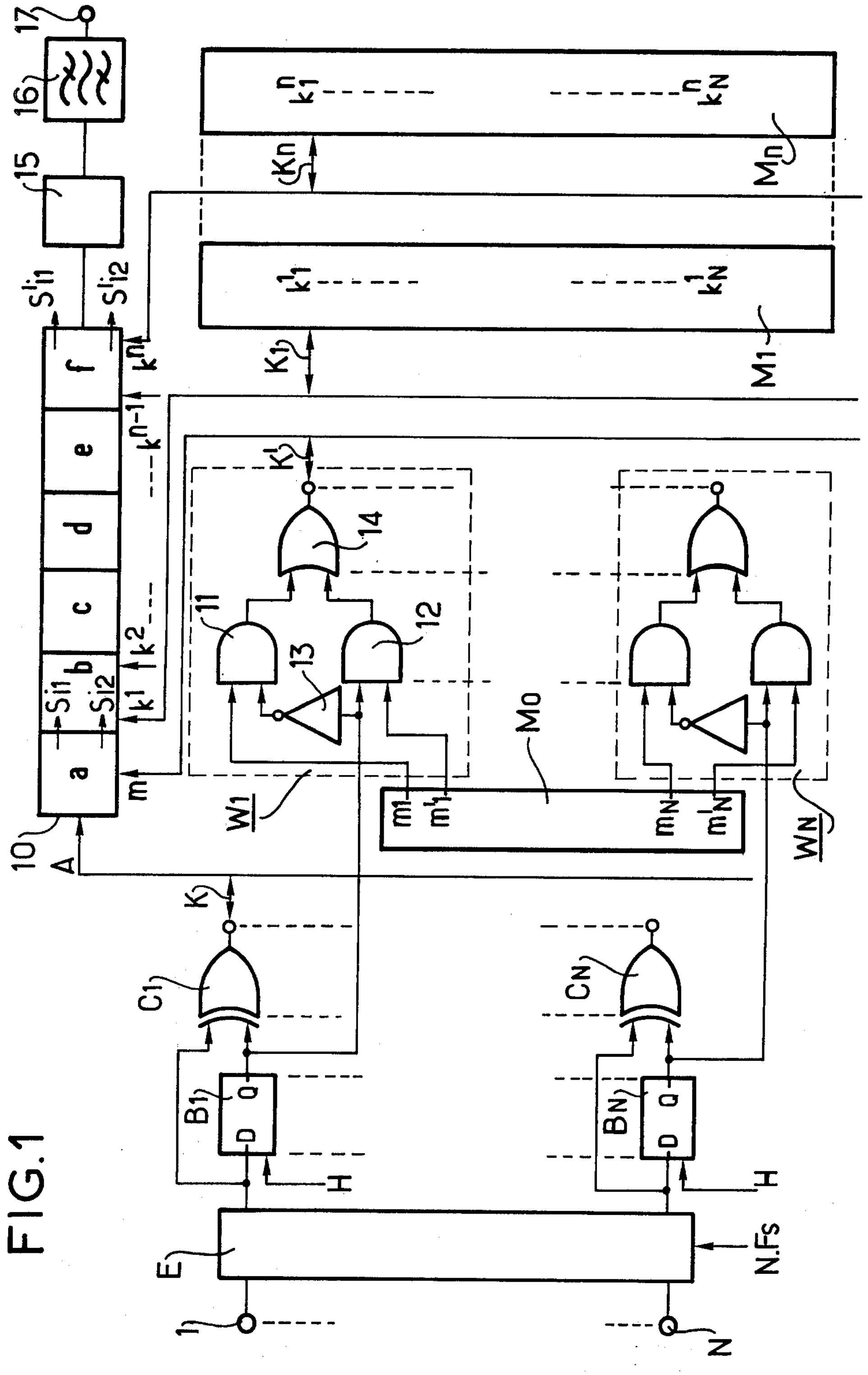
FIG. 1 is a schematic block diagram illustrating one embodiment of the present invention.
Figure 2:
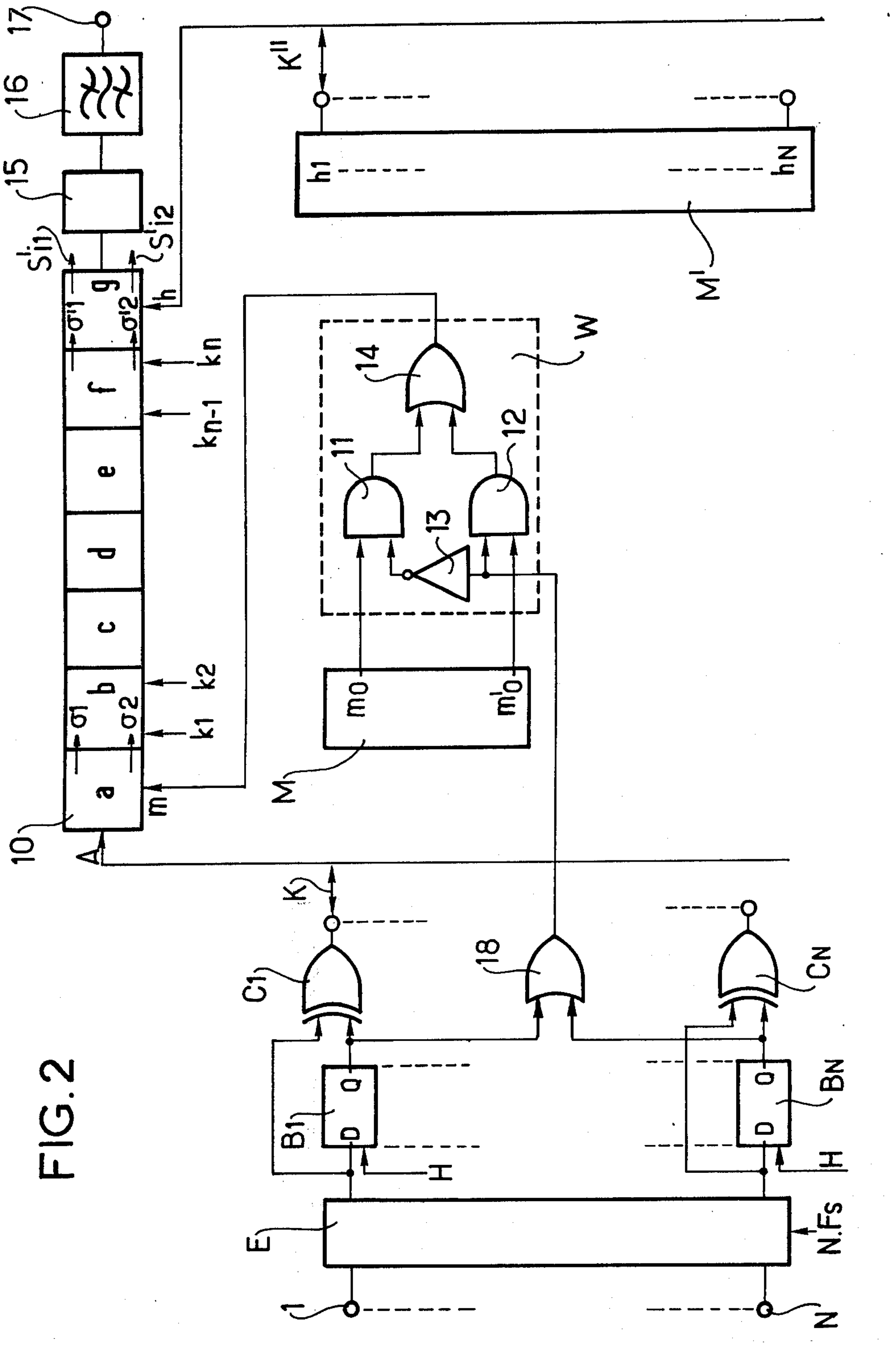
FIG. 2 is a block diagram of a modification of the embodiment of FIG. 1.

The calculation member comprises, in the two schematic diagrams of FIGS. 1 and 2, a series of numerical filters which may all have the same structure and receive different numerical coefficients.

In FIG. 1 the firt cell furnishes 2N series of numbers which correspond to 2N bars or lines in the output spectrum, which is to say, two bars or lines per channel.

In FIG. 2 the first cell furnishes two series of numbers corresponding to two bars or lines of voice-frequency telegraphy which are converted into 2N series of numbers corresponding to 2N lines or bars by one numerical multiplexer.

In the two embodiments, the voice-frequency telegraphy channels are recovered from a numerical-analog converter and an analog band-pass filter.

With reference now to FIG. 1, a numerical calculating member 10 comprises a number $p+1$ of numerical filter element in series, which may advantageously have the same structure, for example, six elements *a, b . . . f*. They have either fixed numerical coefficients, or numerical coefficients selectively extracted from a memory.

The first element a contains a variable coefficient m extracted from a memory $M_o$. In general, it contains a second fixed coefficient which is not shown in FIG. 1. The element b receives a first coefficient $k^1$ extracted from a memory $M_1$, a second coefficient $K^2$ extracted from a memory $M_2$ (not shown), and so forth, through the last element *f*, which receives a coefficient $k^{n-1}$ from a memory $M_{n-1}$, not shown, and a coefficient $k^n$ of a memory $M_n$. For a number *p* of elements or sections after the first element $a$, there will be $n = 2\,p$ coefficients stored in memory.

N telegraphic channels, from 1 to N, are supplied via N terminals of a sampling element E which is switched at a frequency $N.F_s$, wherein N is the number of channels and $F_s$ is the sampling frequency of each individual channel.

At the output of the sampling element E, each channel sample is delivered to a change-of-state detector, comprising an input flip-flop D, an output flip-flop Q ($B_1$ for channel 1 . . . $B_N$ for channel N), a comparator ($C_1$ for channel 1 . . . $C_N$ for channel N), and a commutator with N positions K connected in common to an input terminal A of the filter element. These flip-flops have a clock terminal H which receives a sampling frequency signal.

Each comparator (e.g., $C_1$) advantageously consists of an EXCLUSIVE OR circuit which receives the output of the flip-flop $B_1$ as well as the input applied to this flip-flop. If there is a change of state, there appears at the output of $C_1$ a logic signal applied to the input A of filter element $a$.

The memory $M_o$ contains 2N coefficients, $m_1$, $m'_1$ for the channel 1 . . . $m_N$, $m'_N$ for the channel N, one of the two corresponding to the binary value 1 of the sample in Q, the other to the binary value 0. The coefficient m is chosen as a function of the binary value of the sample by a selector ($W_1$ for the channel 1 . . . $W_N$ for the channel N), comprising two AND gates 11, 12, a logical inverter 13, an OR gate 14, and as a function of the order of the channel by a commutator K' connected in common to a terminal m of the filter element $a$.

The element $a$ is connected in a closed loop, is supplied, at A, with the output of the comparator ($C_1$ . . . $C_N$), and generates a first or a second sequence of numbers $S_{i1}$ or $S_{i2}$ corresponding to a first or to a second frequency of voice telegraphy according to the instantaneous polarity of the channel of interest.

This situation could create a diaphone at decoding. Consequently, the sequences or successions $S_{i1}$ $S_{i2}$ are treated by a numerical filter, the number of cells of which is fixed on the one hand by the number N of channels which form the harmonic beam and, on the other hand, by the modulation speed. For this purpose a numerical filter with five elements $b, c, d, e, f,$ is employed in other words, $p = 5$. Each element comprises two coefficients: $k^1$ and $k^2$, extracted from the memories $M_1$ and $M_2$ respectively by two commutators K1, $K_2$ ($M_2$ and $K_2$ are not shown), . . . $kn^{-1}$, $k^n$, extracted from the memories $M_{n-1}$, $M_n$ by two commutators $K_{n-1}$, $K_n$ ($M_{n-1}$, $K_{n-1}$ are not shown).

From the last element $f$ there are provided, for each channel, two series of numbers $S'_{i1}$, $S'_{i2}$, according to the polarity of the telegraphic input signal.

These series of numbers are applied to a digital-analog converter 15. Since the numerical (digital) filters are periodic an analog band-pass filter 16 eliminates the parasitic bands. The channels of voice-frequency telegraphy are obtained at terminal 17.

By way of example, the device according to FIG. 1 may be applied to the transposition of a group of 24 telegraphic channels at 50 bauds (N = 24) in a channel of the primary base group of multiplexed frequencies covering the band 60–108 kHz. The frequency $F_s$ may then be equal to 112 kHz.

In the wiring diagram according to FIG. 2, wherein those portions corresponding to the elements of FIG. 1 have the same reference numerals. The element a generates two sequences of numbers σ1, σ2, the same for all of the channels, which are the numerical images of two fixed bars or lines. For this purpose, a memory M contains only two coefficients $m_o$, $m'_o$, which are extracted by a selector W, connected to the outputs of all the flip-flops $B_1$ . . . $B_N$ by an OR circuit 18.

Numerical filter 10 with five elements, as previously explained, treats the sequences σ1, σ2 and transforms the same into sequences σ'1 and σ'2 as in the device of FIG. 1. Here, the elements $b$ to $f$ have fixed numerical coefficients $k_1$, $k_2$ . . . $k_{n-1}$, $k_n$.

The element $f$ transmits the sequences of numbers σ'1, σ'2 of the element $g$ which has fixed numerical coefficients $h_1$. . . $h_N$, contained in a memory M', extracted by a commutator K'', and forms by a product of the sequences σ'1, σ'2 2N sequences of numbers identical to the sequences $S'_{i1}$, $S'_{i2}$ explained above.

As previously explained, at the output of digital-analog converter 15 and analog band pass filter 16 the voice-frequency telegraphy channels transposed in the frequency multiplex system are supplied at terminal 17.

The apparatus shown in FIG. 2 contains a multiplexer, in addition to apparatus shown in FIG. 1. On the other hand, the apparatus of FIG. 1 employs $2N + nN$ variable coefficients, and the apparatus of FIG. 2 only $2 + n$; hence, with a smaller memory capacity can be employed. The apparatus of FIG. 2 will be more economical if the number of channels is high; on the other hand, for a small number of channels, the apparatus of FIG. 1 is preferred.

Figure 3:
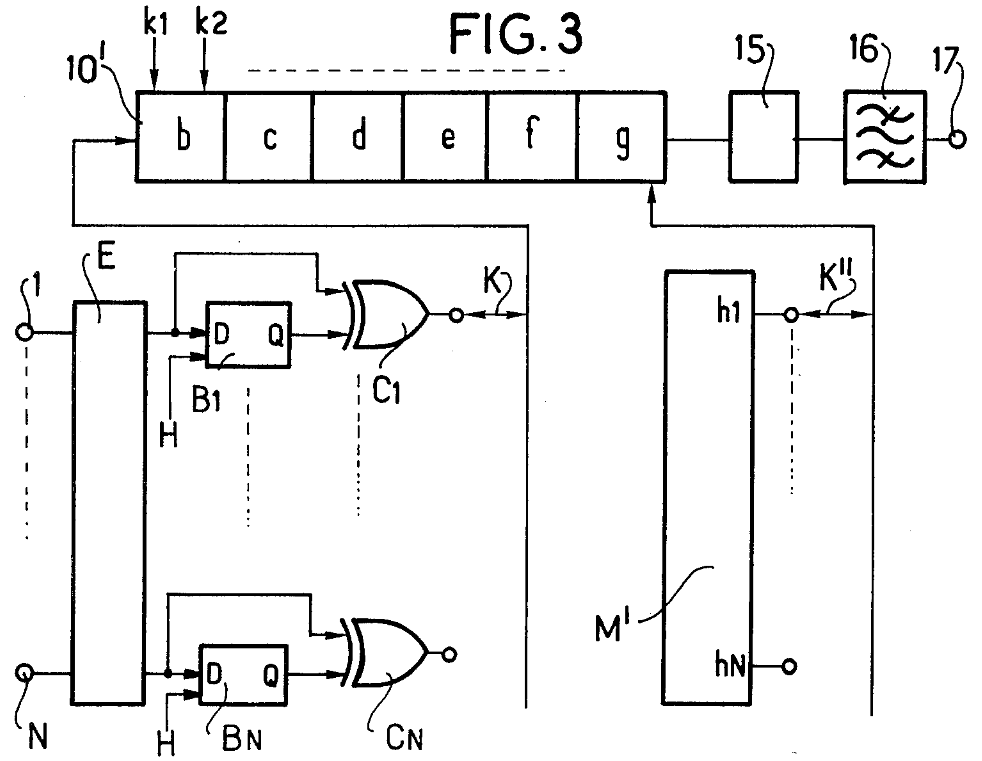
FIG. 3 shows a further modification of the basic system of the invention.

The apparatus of FIG. 3 is a simplified form of the apparatus of FIG. 2, having a coded channel from logic signals of N individual sampled channels.

It comprises a sampler E, which receives on the terminals 1 . . . N the logical sample signals of $n$ channels (for example, $n = 59$), and is connected to change-of-condition detectors N. Each change-of-condition detector comprises a flip-flop (B1 . . . BN) and a comparator (C1 . . . CN). The flip-flops have a terminal H which receives the sampling frequency signal.

A commutator K sequentially applies the output signals of the comparators C1 . . . CN to the input of a filter element 10' comprising, for example, six elements, the elements $b, c, d, e, f,$ forming a fixed numerical filtering modulus. Each element is provided with two fixed coefficients $k$1, $k$2, etc.

The outputs of elements $b$ . . . $f$ are modulated at a sampling frequency (for example, 12, or 24, or 48 kHz) in binary format; this type of modulation is frequently utilized for the transmission of the samples.

Element $g$ is a multiplier, receiving, in order, one of the N coefficients, $h$1 . . . $h$N, contained in a memory M', by means of a commutator K''.

Element $g$ is connected to a digital-analog converter 15 and an analog band pass filter 16 which furnishes, at the output 17, a coded channel grouping the samples of N telephone channels (N = 59, for example in the present case).

Figure 4:
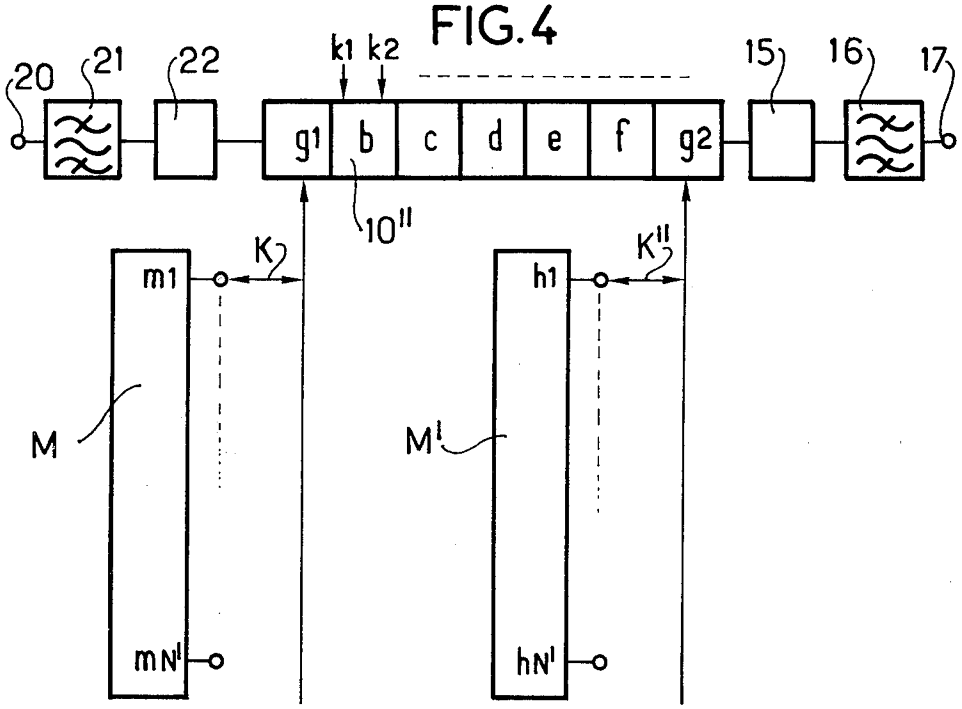
FIG. 4 shows still another embodiment of the invention.

In FIG. 4, the coded channel contained, for example, in a secondary group, arrives on an input 20 of an analog filter 21 which extracts the coded channel. Numeral 22 is an analog-digital converter the output of which is connected to a filter element 10'' which comprises, for example, seven elements. The first element $g$1 is provided with a variable coefficient, $m$1 . . . $m$N', extracted from a memory M by a commutator K. The element $g$1 furnishes a regrouping of N' samples (for example, N' = 12 for a primary group) sampled at a prescribed frequency, and modulated in binary format (by a signal level or at zero, at exemplary sampling frequencies of 12 kHz, 24 kHz, or 48 kHz).

The elements *b* . . . *f* each have fixed coefficients, *k*1, *k*2 . . . form a filtering modulus.

The terminal element *g*2 provided with a variable coefficient *h*1 . . . *h*N' extracted from a memory M' by a commutator K'' furnishes the numerical equivalent of N' carriers modulated in binary format.

At the output of digital-analog converter 15 and an analog band pass 16, the samples are obtained, channel by channel, for N' channels, for example N' = 12 for a primary group at terminal 17.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A modulator apparatus, especially adapted for use with telegraphic signals, comprising:

first means for receiving a plurality of information signal channels and for sequentially scanning each of said channels over a prescribed sampling interval;

a numerically controlled filter connected to the output of said first means, said numerically controlled filter comprising a plurality of filter sections connected in series, the first one of which receives the output of said first means; and second means, coupled to said filter and synchronized with the scan effected by said first means, for supplying to said filter a plurality of filter coefficient signals corresponding to those channels sampled by the scan of said first means in accordance with the order of each respective one of said channels during said scan, said second means including a plurality of memories for storing said coefficients to be supplied to said plurality of filter sections.

2. A modulator apparatus according to claim 1, further comprising a digital-analog converter and a band-pass filter connected in series to the output of said numerically controlled filter.

3. A modulator apparatus according to claim 1, further comprising a digital-analog converter and a band-pass filter connected in series to the output of said numerically controlled filter.

4. A modulator apparatus according to claim 3, wherein said second means includes a first memory for storing a plurality of 2N coefficients to be selectively supplied to said first filter section, wherein N corresponds to the number of sampled channels, and plural further memories, each of which stores coefficients to be selectively supplied to the remaining filter sections of said numerical filter, and means for commutating to each remaining filter section, at least two coefficients stored in said plural further memories in accordance with the scan of said channels.

5. A modulator apparatus according to claim 3, wherein said second means further includes a plurality of logic circuits, respectively responsive to the contents of each sampled information signal channel and coupled to the respective storage positions of said first memory, for gating the filter coefficients stored in said first memory to said first filter section.

6. A modulator apparatus according to claim 5, wherein said second means includes a first memory for storing a plurality of 2N coefficients to be selectively supplied to said first filter section, wherein N corresponds to the number of sampled channels, and plural further memories, each of which stores coefficients to be selectively supplied to the remaining filter sections of said numerical filter, and means for commutating to each remaining filter section, at least two coefficients stored in said plural further memories in accordance with the scan of said channels.

7. A modulator apparatus according to claim 3, wherein said second means comprises a first memory for storing a pair of coefficients to be selectively supplied to said first filter section, and a logic circuit, respectively responsive to the contents of every sampled information signal channel and coupled to the respective storage positions of said first memory in which said pair of coefficients are stored, for selectively gating said pair of filter coefficients to said filter section.

8. A modulator apparatus according to claim 3, wherein the last filter section of said numerical filter comprises a multiplier coupled to receive the outputs of the previous filter sections and respective selected coefficients stored in a memory of said second means.

9. A modulator apparatus according to claim 3, further comprising a further numerical filter and respective memories switchably coupled to the respective sections thereof, coupled by way of a further band-pass filter and analog-to-digital converter, for effecting a secondary filtering operation on the output of said first-mentioned numerical filter.

10. A modulator apparatus according to claim 1, wherein said plurality of information signal channels are binary information signal channels.

* * * * *